US006507399B1

(12) United States Patent
Andrieu et al.

(10) Patent No.: US 6,507,399 B1
(45) Date of Patent: Jan. 14, 2003

(54) DEVICE FOR ADJUSTING ANGULAR PLAY

(75) Inventors: Philippe Andrieu, Paris (FR); Alain Thevenon, Bretigny sur Orge (FR)

(73) Assignee: Jobin Yvon S.A., Longjumeau (FR)

(*) Notice: Subject to any disclaimer, the term of this patent is extended or adjusted under 35 U.S.C. 154(b) by 0 days.

(21) Appl. No.: 09/582,627
(22) PCT Filed: Dec. 29, 1998
(86) PCT No.: PCT/FR98/02910
§ 371 (c)(1),
(2), (4) Date: Aug. 21, 2000
(87) PCT Pub. No.: WO99/35472
PCT Pub. Date: Jul. 15, 1999

(30) Foreign Application Priority Data

Jan. 6, 1998 (FR) .............................. 98 00058

(51) Int. Cl.⁷ ............................... G01J 3/06; G02B 7/00
(52) U.S. Cl. ........................................ 356/332; 356/334
(58) Field of Search ............................. 356/331, 332, 356/333, 334, 326, 328, 308

(56) References Cited

FOREIGN PATENT DOCUMENTS

EP    0 124 448    11/1984

OTHER PUBLICATIONS

T.M. Niemczyk and G.W. Gobeli: "Characteristics of a Direct Grating Drive" Applied Spectroscopy, vol. 42, No. 5, 1998, pp. 792–796.

*Primary Examiner*—F. L. Evans
(74) *Attorney, Agent, or Firm*—Arent Fox Kintner Plotkin Kahn

(57) ABSTRACT

The invention concerns a device for adjusting angular play on a predetermined angular range of an optical element mobile in rotation relative to a frame. Said device comprises a contact piece (3), integral with the optical element, and an elastic steady arm (4). The steady arm has a first end (41) fixed to the frame and a second end (42) co-operating with the contact piece when the mobile element is oriented in the predetermined angular range, at least when the mobile element enters said angular range in the rotational direction (S1), such that the steady arm exerts on the mobile element a counter-torque. Said second end does not co-operate with the contact piece when the mobile element is oriented outside the angular range.

11 Claims, 4 Drawing Sheets

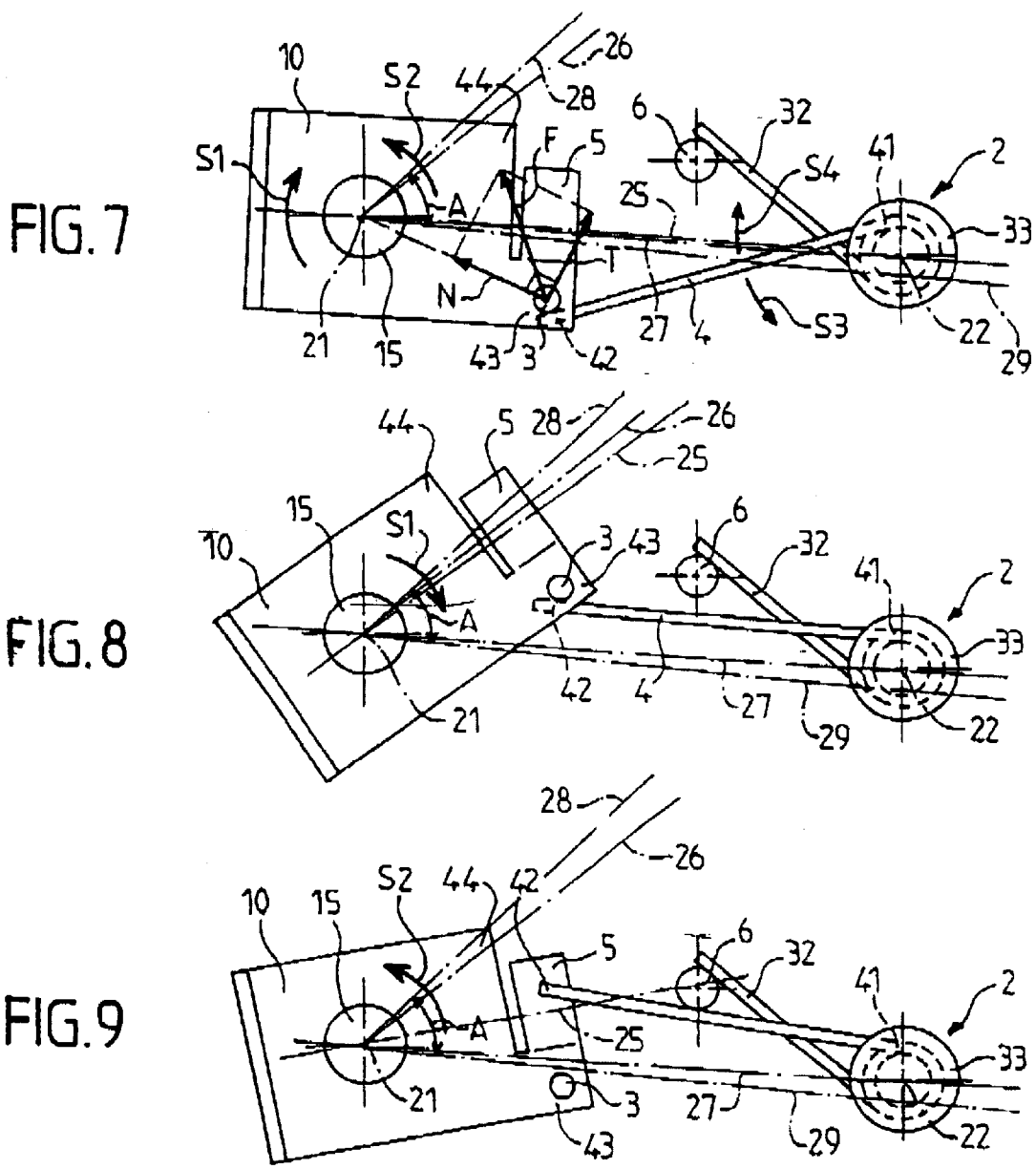

DEVICE FOR ADJUSTING ANGULAR PLAY

The invention concerns a device for adjusting angular play on a predetermined angular range of an optical element mobile in rotation relative to a frame. It is notably applicable to driving a diffraction grid in a monochromator system.

Various mechanisms capable of driving and positioning in rotation a mobile optical element are already known, such as sinus bars. Generally, the angular range useful for rotation positioning is limited. For a diffraction grid, notably, it is usually comprised between 5° and 60°. It is interesting, in order to control the orientation of the optical element over this angular range, to make use of a stepping motor, associated with a reduction ratio, so that the number of points on the predetermined angular range is increased. For example, whereas a stepping motor offers a few tens to approx. 400 points per revolution, the reduction ratio enables to cover 1000 points over 30°.

The driving system of the mobile optical element generates however transmission plays which are made even worse in the presence of a large reduction ratio. To obtain accurate positioning, it is therefore necessary to compensate for these plays. A known device for adjusting angular play for a monochromator system in which the diffraction grid is carried by a square, comprises a draw spring mounted on the square. This device only allows for limited rotation of the grid around its rotational axis, because the spring winds around this axis and a microswitch must be placed to avoid damaging the device in case of maloperation.

This device has the shortcoming of a mechanical transmission with limited angular travel. Moreover, the microswitch is necessary to secure the mechanism and involves additional costs. Another shortcoming of this device is that the spring applies to the square a torque that varies substantially over the angular measuring range, which is detrimental to the quality of the play adjustment, It is an object of this invention to offer a device for adjusting angular play over a predetermined angular range that enables mechanical transmission with unlimited angular travel. This device enables therefore to do away with a microswitch.

The invention concerns such a device that is able to secure transmission at low cost and without any damage.

The device of the invention also enables to obtain a counter-torque to the driving torque with little variation over the whole predetermined angular range.

To this end, the invention applies to a device for adjusting angular play on a predetermined angular range of an optical element mobile in rotation relative to a frame.

According to the invention, the device comprises:
a contact piece integral with this element, and
an elastic steady arm with two ends.

A first of these ends is fixed to the frame. The second end cooperates with the contact piece when the mobile element is oriented in the angular range, at least when the mobile element enters this angular range in an active rotational direction, so that the steady arm exerts on the mobile element a counter-torque. This second end does not co-operate with the contact piece when the mobile element is oriented outside this angular range.

Advantageously, the rotation-mobile optical element is a diffraction grid of a monochromator, carried by a square mobile in rotation around an axis.

The aperture of the angular range is comprised between 5° and 60°.

The orientation of the mobile element is preferably defined using a reference axis integral with the mobile element and rotating with it around the rotational axis of the element. The mobile element is then 'oriented' in the angular range when the mobile axis is in this angular range.

The device of the invention enables to exert a counter-torque selectively on the predetermined angular range and to let the mobile element rotate freely around its rotational axis outside this range, thanks to the co-operation of the contact piece and the steady arm. Thus, mechanical transmission has a limited angular travel and the play adjustment is conducted reliably on the angular range.

In certain embodiments, when the mobile element is oriented outside the angular range and enters the same, the play adjustment is performed automatically, whatever the entrance direction of the mobile element in the angular range. Thus, in a peculiar embodiment, the contact piece is arranged in the centre of the mobile element.

In other preferred embodiments, play adjustment is engaged selectively according to the entrance direction of the mobile element in the angular range. Thus, play adjustment can be controlled quite reliably and very accurately, since it is only effective when the angular range is entered in the expected direction.

Thus, preferably, the mobile element has an inactive rotational direction, the second end not co-operating with the contact piece when the mobile element enters the angular range in the inactive rotational direction.

Once the play adjustment is engaged, the mobile element having is entered the angular range in the active rotational direction, the play adjustment continues as long as the mobile element remains oriented in the angular range, regardless of its rotations (and notably their directions) within this range.

Conversely, when the mobile element enters the angular range in the inactive rotational direction, it is subject to a non-extant or very small counter-torque, regardless of its orientation in the angular range.

In the embodiments with active and inactive rotational directions, the device for adjusting play comprises advantageously a reset stop intended to block the steady arm in one displacement direction of the arm matching the inactive rotational direction of the mobile element, so that the counter-torque is greater than a threshold value as soon as the mobile element enters the angular range in the active rotational direction.

This arrangement promotes the preservation of a counter-torque with little variations over the whole angular range, whereas this torque differs from zero as soon as the mobile element enters the angular range.

In this preferred embodiment of the device for adjusting play with active and inactive rotational directions of the mobile element, the device comprises a retractable ramp integral with the mobile element and intended to co-operate with the steady arm when the mobile element enters the angular range in the inactive rotational direction, in order to prevent the steady arm from co-operating with the contact piece while conferring the counter-torque a negligible value By 'ramp' is meant a tilted element with possibly variable slope along a given direction.

The retractable ramp enables to avoid, in the inactive direction, any contact between the mobile element and the steady arm. It implies that the steady arm should be elastic not only on a plane perpendicular to the rotational axis of the mobile element, but also on a plane corresponding to the slope of the ramp. According to a peculiar embodiment in which the ramp extends between the mobile element and the steady arm, both planes are overlapping.

The retractable ramp and the steady arm are such that when the steady arm escapes from the contact piece after overshooting the end position corresponding to the active rotational direction, the steady arm returns beneath the retractable ramp. Thus, the retractable system is again ready to operate in the case of a rotation of the mobile element in the inactive direction.

Preferably, the retractable ramp is rising and extends above the contact piece.

According to other embodiments, the retractable ramp is falling or extends between the contact piece and the steady arm, while being curved towards the contact piece In another embodiment, the contact piece is rigid when it touches the steady arm in the active rotational direction and it is flexible when it touches the steady arm in the inactive rotational direction.

Advantageously, the contact piece and the steady arm are such that the counter-torque exhibits a small relative variation on the angular range, preferably smaller than 25%.

The parameters corresponding to the contact piece and to the steady arm ran be optimised for minimum variation. Indeed, the counter-torque applied depends notably on the lever arm formed by the steady arm and the contact piece, this lever arm varying according to the position of the mobile element on the angular range, as well as on the righting torque exerted on the steady arm.

Advantageously, the steady arm is coupled by its first end to a torsional spring.

The torsional spring then applies to the steady arm a righting torque that is different from the counter-torque applied by the steady arm on the mobile element. Whereas the righting torque increases substantially with the steady angle on the angular range, the contact piece and the steady arm are arranged advantageously so that the counter-torque exhibits variations with smaller relative magnitude.

As the torsional spring is formed of a winding around an axis, the steady arm consists advantageously of one end of the torsional spring, mobile in rotation around this axis.

Preferably, the torsional spring comprises contiguous spires that enable to generate automatic elastic steadying by piling up the spires.

In the embodiment with reset stop of the steady arm, this reset stop should advantageously serve simultaneously as a stop for a blocking end of the torsional spring. In another embodiment with a torsional spring, the device for adjusting play comprises two stops: one for the steady arm and another for the blocking end of the torsional spring.

In another embodiment, the steady arm is an elastic blade.

Preferably, the contact piece is a cylindrical stud. Thus, contact between the contact piece and the steady arm can be controlled efficiently.

The steady arm is preferably coupled with vertical steady means.

This embodiment is particularly interesting in the presence of a rising or falling retractable ramp. Indeed, the steady arm is then subject to vertical movements, in addition to its horizontal rotational movements, and the vertical righting means enable to bring back the steady arm to its initial position in height (advantageously horizontal).

These vertical-righting means comprise advantageously a flange containing at least one elastic element, mounted on the first end of the steady arm.

According to an advantageous embodiment of this flange, it comprises an elastic washer (for example a spring washer or a crinkle washer) co-operating with the steady arm, for example via a rigid washer.

The arrangements, embodiments and characteristics of this invention will appear more clearly using the detailed description of a particular embodiment in conjunction with the appended drawings on which:

FIG. 7 is a top view of the device for adjusting angular play of FIGS. 4 to 6, in a first position close to the escapement position of the steady arm;

FIG. 8 is a top view of the device for adjusting angular play of FIGS. 4 to 6, in a second position corresponding to the engagement of the device for adjusting angular play;

FIG. 9 is a top view of the device for adjusting angular play of FIGS. 4 to 6, in a third position corresponding to the retraction of the device for adjusting angular play;

Figure 1:
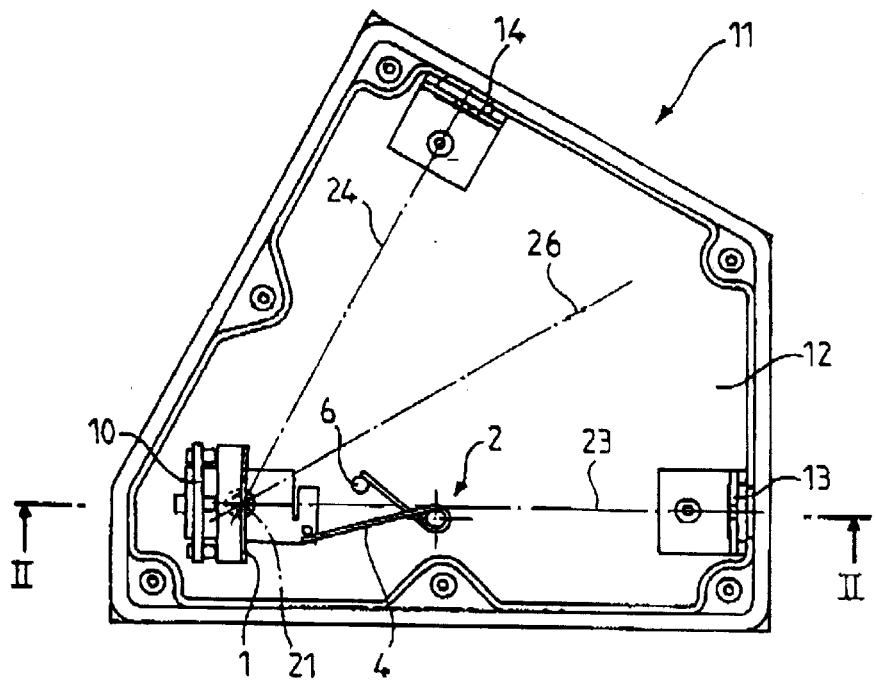
FIG. 1 is a top view of monochromator system, fitted with a device for adjusting angular play according to the invention.
Figure 2:
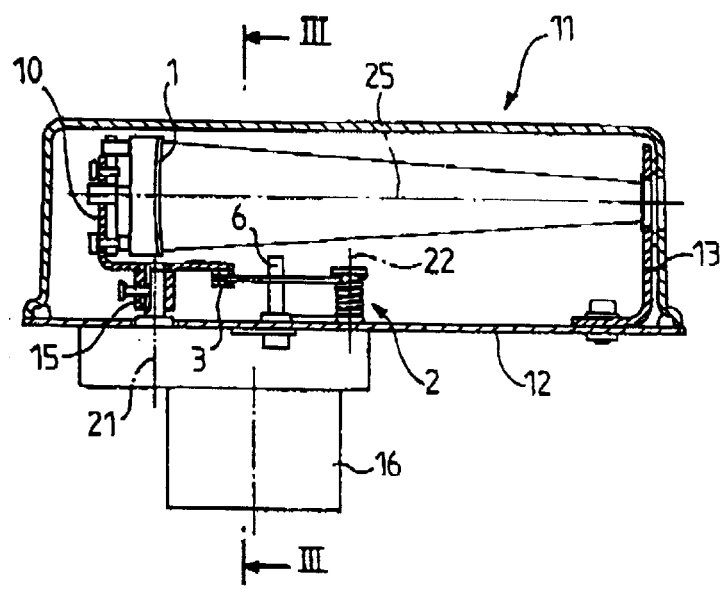
FIG. 2 is a side view of the monochromator of FIG. 1 along the line II—II.
Figure 3:
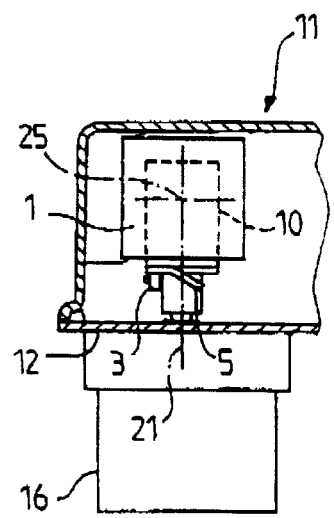
FIG. 3 is a partial front view of the monochromator of FIGS. 1 and 2 along the line III—III.
Figure 4:
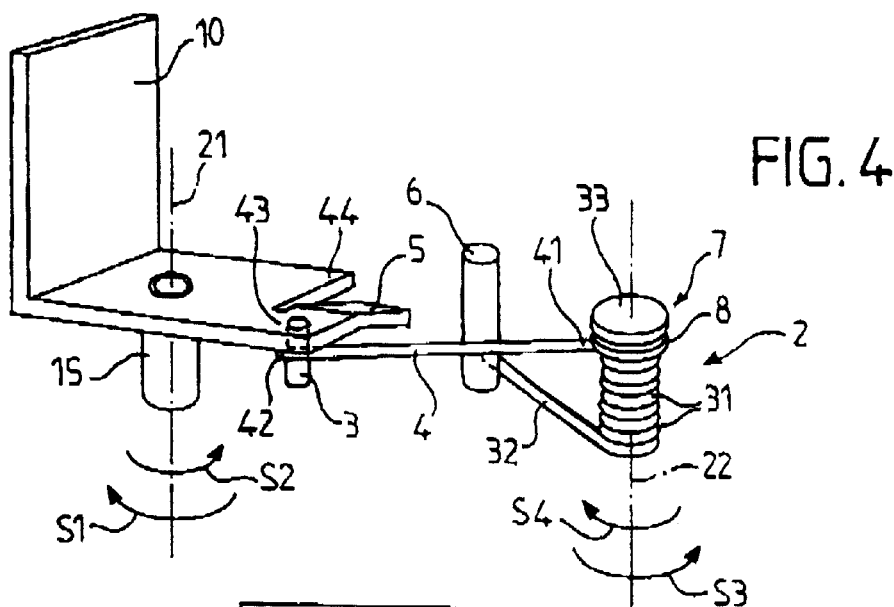
FIG. 4 is a perspective view of the device for adjusting angular play used in the monochromator of FIGS. 1 to 3.
Figure 5:
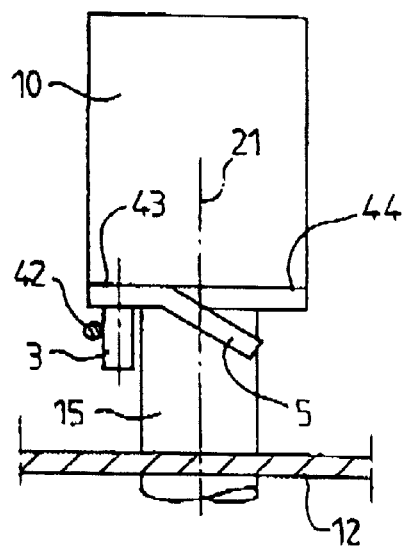
FIG. 5 is a front view V—V of a portion of the device for adjusting angular play of FIG. 4.
Figure 6:
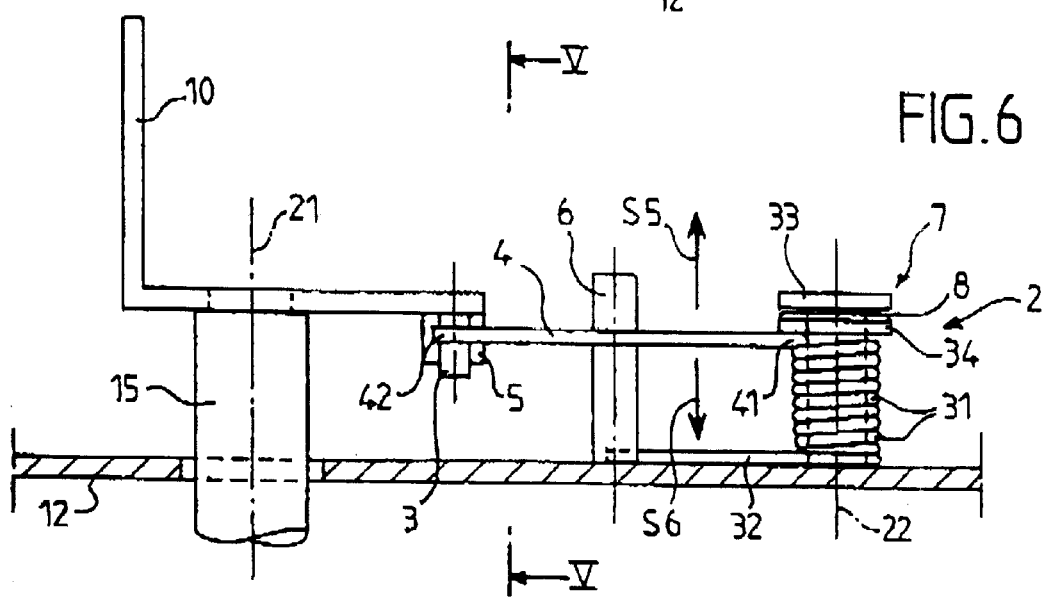
FIG. 6 is a side view of the device for adjusting angular play of FIGS. 4 and 5.

A monochromator system 11 comprises a frame 12 on which are secured an input 13 of a luminous beam to measure and an output 14 of a luminous beam centred around a wavelength and derived from the measuring luminous beam. The monochromator 11 comprises a diffraction grid carried by an angular piece 10, called a square, which is mobile in rotation by a shaft 15 around an axis 21 fixed relative to the frame 12. The shaft 15 is driven into rotation by a motor (not shown) contained in a housing 16 situated beneath the frame 12.

The grid 1 has an angular orientation delineated by the orientation of an axis 25, substantially perpendicular to the surface of the grid 1 and going through its optical centre.

The input beam being oriented along an input axis 23 and the output beam along an output axis 24, the orientation axis 25 is preferably comprised between an axis close to the bisector 26 of the input 23 and output 24 axes and a direction offset at an angle relative to this bisector 26, whereas the grid 1 faces the input 13. The grid 1 thus covers an angular range A advantageously comprised between 5° and 60° and for example equal to 40°.

In operation, a polychromatic input beam is sent by the input 13, received by the grid 1 and diffracted by this grid 1 in different spatial directions. The output 14 enables to collect an output beam with predetermined wavelength that depends on the orientation of the grid 1.

The monochromator system 1 is fitted with a device for adjusting angular play on the angular range A, detailed more particularly on FIGS. 4 to 9. This device comprises a torsional spring 2 formed of contiguous spires 31 wound round a vertical axis 22 (i.e. perpendicular to the plane of the frame 12). The torsional spring 2 has a first blocking end 32 that is held in position by contact against a vertical stop 6 secured to the frame 12. It also has a second end 4 forming a steady arm. This steady arm 4 is mobile in rotation around the axis 22 of the spring 2. It is coupled to the spring 2 via a first end 41 and can be brought into rotation by resting on its second end 42. Preferably, the steady arm 4 is set in its initial position thanks to an activating stop. Advantageously, this stop is the stop 6, whereas the steady arm 4 is resting against the stop 5 in initial position, on one side of the stop 6 opposite the end 32 of the spring 2.

The spring 2 is covered with a flange 7 intended for securing the vertical movements of the steady arm 4 and its vertical return movement. The flange 7 comprises an elastic washer 8, provided between a rigid shoulder 33 and a rigid washer 34 located on the steady arm 4.

The shoulder 33 can be replaced by any other means enabling to limit the upward movement of the elastic washer 8, such as a screw.

Thus, the steady arm 4 is mobile in rotation around the axis 22 of the spring 2, in a first direction 83 away from the stop 6 and in a second direction S4 oriented to the stop 6, and it is mobile upwards (direction S5) and downwards (direction S6).

The steady arm 4 is preferably the upper end of the spring 2.

The device for adjusting angular play also comprises elements integral with the grid-carrying square 10. These elements contain a cylindrical pin 3 designed for pressing against the end 42 of the steady arm 4. This pin 3 is preferably vertical and is fixed at right angle 10 internally in a corner 43 opposite the grid 1.

The device for adjusting angular play also comprises a rising ramp 5, provided at the edge of the square 10 opposite the grid 1, whereas this edge of the square 10 is delineated by the corner 43 and by a corner 44 opposite the corner 43. The ramp 5 starts below the level of the square 10 and beneath the corner 44 in relation to the stud 3, and it climbs to the corner 43 above the stud 3.

The different elements of the device for adjusting angular play co-operate as follows. Two rotational directions are defined: S1, the active direction that is the usual rotational direction of the grid when measuring, and S2 the inactive direction that is not normally used, of the grid 1 around its rotational axis 21, that are respectively the same as the rotational direction S4 and S3 of the steady arm 4 around the axis 22 of the spring 2. In the example represented, the directions S1 and S4 are clockwise and the directions S2 and S3 are trigonometric.

When the grid 1 is oriented outside the angular range A, it is not subject to angular play adjustment. While rotating the grid 1 in the rotational direction S1, the stud 3 is finally brought into contact with the steady arm 4 (FIG. 8). This inlet position into the angular range A coincides with the superimposition of the orientation axis 25 and of an engagement axis 28, ahead of the bisector 26 by a small angle (in the direction S1), for instance in the order of 1° to 2°. The steady arm 4 exerts then on the stud 3 a counter-torque $C_a$ opposing the driving torque that bring the grids 1 into rotation, This counter-torque $C_a$ is different from zero as soon as the stud 3 and the steady arm 4 are in contact, thanks to the spring 2 that is activated by the stop 6.

By rotating the grid 1 in the direction S1, the steady arm 4 is brought to rotate in the direction S3 further to contact with the stud 3. The end 42 of the steady arm 4 then exerts on the stud 3, a force F (FIG. 7) that can be broken down into a normal component N oriented to the rotational axis 21 and a tangential component T, perpendicular to the normal component N. The value of the counter-torque $C_a$ exerted by the steady arm 4 on the stud 3 is proportional to the tangential component T. This tangential component T depends notably on the righting torque $C_r$ of the spring 2 and the distance between the end 41 of the steady arm 4 and the contact point of the stud 3 with the end 42. The parameters of the device for adjusting angular play comprising notably the length of the steady arm 4 and the arrangement of the stud 3, are selected in order to minimise the variations of the counter-torque $C_a$ on the angular range A.

Figure 10:
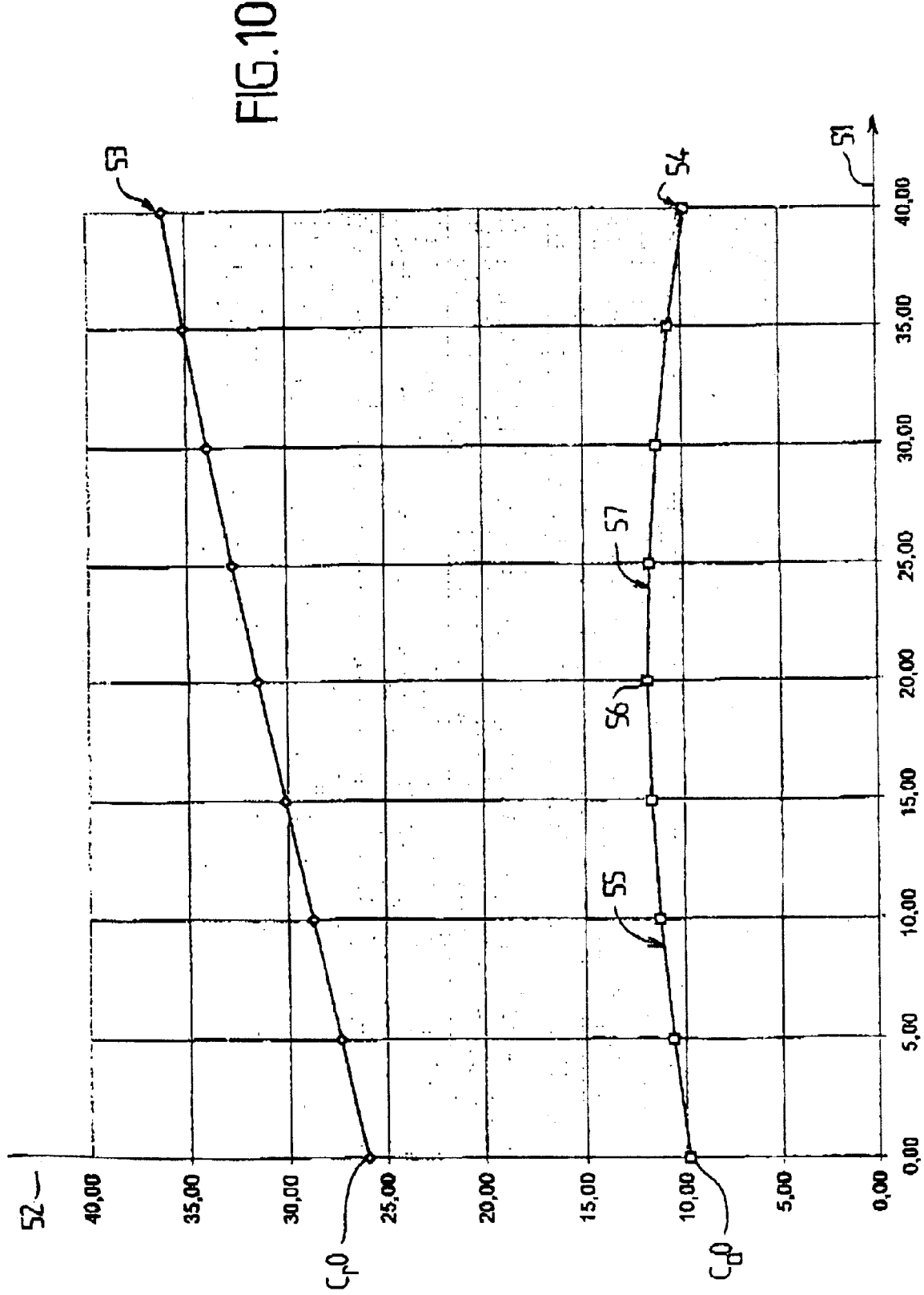
FIG. 10 shows variations plots of the righting torque applied to the steady arm and of the counter-torque applied by the steady arm on the diffraction grid of the monochromator, in relation to the angular orientation of the monochromator.

In the represented embodiment, the curves 53 and 54 of the respective variations of the righting torque $C_r$ and counter-torque $C_a$ on the angular range A are plotted on FIG. 10. The angular range A having a 40° aperture, the curves 53 and 54 are represented along two axes 51 and 52 providing respectively the orientation of the grid 1, expressed in degrees and reset to 0 when the stud 3 contacts the steady arm 4, and the value of the torques in N.mm. It can be noted that the righting torque $C_r$ increases continuously and in a quasi-linear fashion on the angular range A, from an initial value $C_r0$ in excess of 39%. The counter-torque $C_{a1}$ from an initial value $C_a0_1$ increases slightly (portion 55) before reaching a maximum 56 around 20°, then decreases (portion 57). The variations of the counter-torque $C_a$ around its initial value $C_a0$ do not exceed 25%.

When we carry on rotating the grid 1 in the direction S1, the stud 3 ends up reaching the end 42 of the steady arm 4 and escaping therefrom when the orientation axis 25 coincides with an escapement axis 29. The steady arm 4 is then brought back into initial position against the stop 6 by the torsional spring 2. The engagement 28 and escapement 29 axes thus delineate the limits of the angular range A. The length of the ramp 5 is short enough so that, when the stud 3 escapes, the steady arm 4 reaches beneath the ramp 5 and thus does not stay way below the same.

When the grid 1 is oriented outside the angular range A and when it is rotated from such a position in the direction S2, the ramp 5 meets the steady arm 4 and passes the said arm over the stud 3 by imparting an upward movement to the said arm (direction S5). Once the end 42 of the steady arm 4 overshoots the corner 43 of the square 10, the steady arm 4 is brought back to horizontal position using the elastic washer 8 of the flange 7, and is thus ready for operation again. During this retraction of the stud 3 via the ramp 5, the steady arm remains against the stop 6 and exerts on the square 10 an effort generating a negligible value of the counter-torque $C_a$.

Thus:

the angular play is not adjusted outside the angular range A, the angular play is adjusted only on the angular range A when the grid 1 enters the said range in the direction S1, and the counter-torque $c_a$ exerted in the angular range A by the device for adjusting play exhibits small variations.

What is claimed is:

1. A device for adjusting angular play on a predetermined angular range (A) of an optical element (1) mobile in rotation relative to a frame (12), characterised in that it comprises:

a contact piece (3) integral with the said element (1), and an elastic steady arm (4) with two ends, whereas a first of the said ends (41) is fixed to the frame (12) and the second end (42) co-operates with the contact piece (3) when the mobile element (1) is oriented in the said angular range (A), at least when the mobile element enters the said angular range in an active rotational direction (S1), So that the steady arm (4) oxorts on the mobile element (1) a counter-torque ($C_a$) and the said second end (42) does not co-operate with the contact piece (3) when the mobile element is oriented outside the said angular range.

2. A device according to claim 1, characterised in that the mobile element has an inactive rotational direction (S2), i.e.

the said second end (42) does not co-operate with the contact piece (3) when the mobile element enters the said angular range in the inactive rotational direction (S2).

3. A device according to claim 2, characterised in that it comprises a reset stop (6) intended to block the steady arm (4) in one displacement direction (S4) of the arm (4) matching the inactive rotational direction (S2) of the mobile element (1), so that the said counter-torque ($C_a$) is greater than a threshold value as soon as the mobile element enters the said angular range (A) in the active rotational direction (S1).

4. A device according to any of the claims 2 or 3, characterised in that it comprises a retractable ramp (5) integral with the mobile element (1) and intended to co-operate with the steady arm (4) when the mobile element enters the angular range (A) in the inactive rotational direction (S2), in order to prevent the steady arm (4) from co-operating with the contact piece (3) while conferring the counter-torque ($C_a$) a negligible value.

5. A device according to claim 4, characterised in that the retractable ramp (5) is rising and extends above the contact piece (3).

6. A device according to claim 1, characterized in that the contact piece (3) and the steady arm (4) are such that the counter-torque ($C_a$) exhibits a small relative variation on the said angular range (A).

7. A device according to claim 1, characterised in that the steady arm (4) is coupled by its first end (41) with a torsional spring (2).

8. A device according to claim 1, characterised in that the contact piece (3) is a cylindrical stud.

9. A device according to claim 1, characterised in that the steady arm (4) is coupled with vertical steady means (7).

10. A device according to claim 9, characterised in that the vertical steady means comprise a flange (7) containing at least one elastic element (8), mounted on the first end (41) of the steady arm (4).

11. A device according to claim 6, wherein the relative variation on the angular range is smaller than 25%.

* * * * *